United States Patent [19]

Mittelhauser

[11] 4,153,342

[45] May 8, 1979

[54] SIDE VIEW MIRROR WITH INVERTING SPINDLE

[76] Inventor: Bernhard Mittelhäuser, No. 57, D-3002, Wedemark, 2, Fed. Rep. of Germany

[21] Appl. No.: 852,988

[22] Filed: Nov. 21, 1977

[30] Foreign Application Priority Data

Dec. 13, 1977 [DE] Fed. Rep. of Germany ....... 2652978

[51] Int. Cl.² .......................... G02B 5/08; G02B 7/18
[52] U.S. Cl. ................................................ 350/289
[58] Field of Search ............ 350/289, 279; 74/501 M, 74/471 XY, 89.15

[56] References Cited

U.S. PATENT DOCUMENTS

| 3,609,014 | 9/1971 | Kurz | 350/289 |
|---|---|---|---|
| 3,788,734 | 1/1974 | McDuffee | 350/289 |
| 4,022,076 | 5/1977 | Metz | 74/89.15 |
| 4,076,392 | 2/1978 | Suzuki et al. | 350/289 |

Primary Examiner—Jon W. Henry
Attorney, Agent, or Firm—Becker & Becker, Inc.

[57] ABSTRACT

A side view mirror for motor vehicles in which the mirror holding member is adjustable by at least one motor driven adjusting member which is connected to the mirror holding member. Each adjusting member includes an inverting spindle.

8 Claims, 4 Drawing Figures

SIDE VIEW MIRROR WITH INVERTING SPINDLE

The present invention relates to a side view mirror for motor vehicles, which mirror is adjustable by a motor through the intervention of one or more spindles.

These spindles used in connection with this type of mirror are intended to convert a rotary movement into an axial movement while the rotary movement may be effected by a small electric motor, and while the axial movement can be taken advantage of for effecting a pivoting or tilting movement of the mirror body. Generally the axial movement is converted into a change in the length of an adjusting member, and this is effected by a spindle and a nut member.

With heretofore known mirrors of the type involved, the electric motor is reversed for bringing about a back and forth movement. The user of the mirror must, therefore, effect a reversing of the motor and has to see to it that the motor is stopped in the desired position of the mirror body or that the current supply to the motor is interrupted in this desired position. If, in this connection, the mirror body is pivoted too far in one direction, the electric motor has to be reversed again, the mirror body has to be pivoted back and finally the current supply to the electric motor has to be cut off. Aside from the fact that this operation requires a particular alertness of the operator, a reversible electric motor is necessary.

It is, therefore, an object of the present invention so to improve the above mentioned mirror that a reversible motor will not be necessary and that the operating person will not have to meet any particular requirements as to his control agility.

This object and other objects and advantages of the invention will appear more clearly from the following specification in connection with the accompanying drawing, in which.

Figure 1:
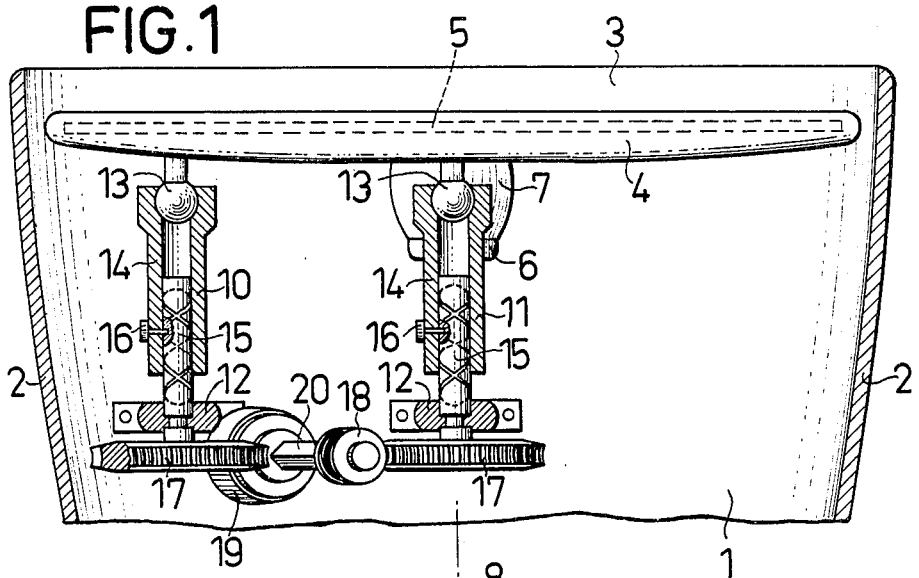
FIG. 1 represents a horizontal section through a side view mirror according to the invention and, more specifically, shows the front portion thereof with the most important structural elements.
Figure 2:
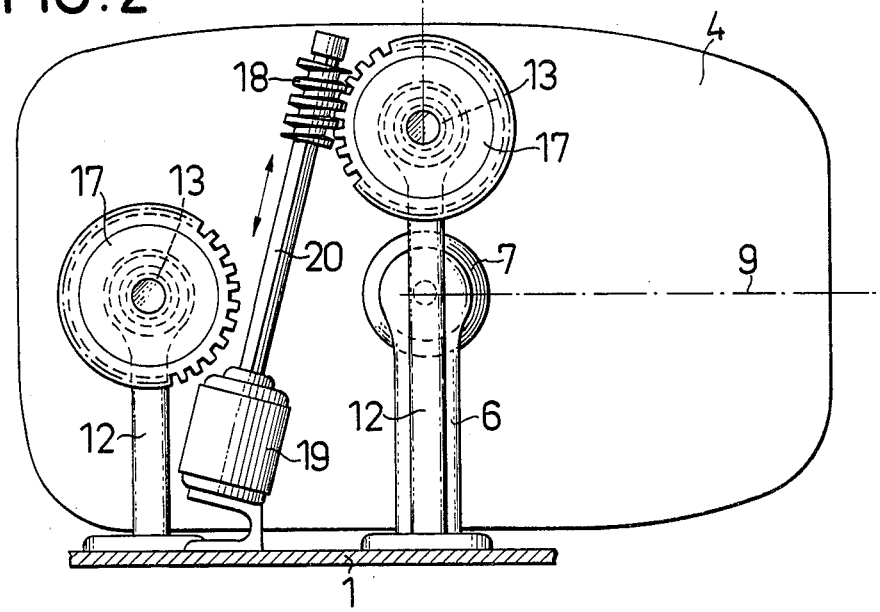
FIG. 2 shows the mirror holding and adjusting means as viewed in the direction toward the back side of the mirror holding means, while the outer mirror housing has been omitted.

For realizing the above outlined object, inverting spindles are employed according to the invention while by inverting spindles there are meant spindles which have a left-hand and a right-hand thread in such a way that at the ends of the spindles respectively the left-hand thread merges with the right-hand thread and the right-hand thread merges with the left-hand thread. A nut or the like cooperating with such spindle is during the rotation of the spindle in one direction moved back and forth. With a corresponding design of the adjusting member for the spindle body, the latter will after the electric motor has been switched on continuously carry out a movement, for instance a pivoting movement, and more specifically a back and forth movement from one end position to the other end position. While doing this, the mirror body passes through all possible positions. When a desired position is reached, the electric motor is switched off. If the operating person should miss a desired position, the electric motor continues its adjusting movement and when then the desired mirror position has again been reached, the electric motor can be switched off.

Referring now to the drawing in detail, of the mirror housing, which has a funnel shape, only the front portion is shown which comprises the section having the greater diameter. In this mirror housing section which has a bottom 1 and side walls 2 there are provided mirror holding means 4 which are located within the region of the opening 3. Within the mirror holding means 4 there is located the mirror body 5 which is shown only in dash lines. The pivotal mounting of the mirror holding means 4 is effected in customary manner by an arm 6 which is connected to the bottom 1 and which through a ball joint 7 is connected to the mirror holding means 4.

To be able selectively to pivot the mirror holding means 4 or the mirror body 5 about the vertical axis 8 and the horizontal axis 9, two adjusting members 10, 11 are provided the length of which can be changed. The members 10 and 11 extend substantially horizontally and are connected to the bottom 1 by means of a support 12, or they are mounted on the bottom 1. The adjusting members 10, 11 are linked to the mirror holding means 4 through the intervention of small ball joints 13.

A change in the length of the adjusting member 11 thus brings about a pivotal movement of the mirror about the horizontal axis 9, whereas a change in the length of the adjusting member 10 brings about a pivotal movement of the mirror about the vertical axis 8. Each of the adjusting members 10 and 11 comprises an outwardly located longitudinally displaceable sleeve 14 and a spindle 15 which is not axially displaceable in the sleeve 14. Spindle 15 is designed as an inverting spindle and has a left-hand thread and a right-hand thread, while these threads respectively merge at their ends with each other. Mounted on the sleeve 14 is a pin 16 which engages the thread of the spindle 15.

The turning of the spindles 15 is effected through the intervention of a worm wheel 17, a worm 18, and an electric motor 19 mounted on the bottom 1. However, it should be noted that only one driving worm 18 is provided for both worm wheels 17. The worm 18 is longitudinally displaceably mounted on the motor shaft 20 and can selectively, by sliding means (not shown), be brought into engagement with one or the other worm wheel 17. This design and utilization of a drive motor is, however, not a part of the present invention.

Inasmuch as the spindles 15, due to their mounting in the supports 12, can rotate only but cannot be displaced in their longitudinal direction, and since furthermore the sleeves 14, which are non-rotatably mounted, through their pins 16 engage the thread of the spindles 15, the length of the adjusting members is continuously changed when the pertaining worm wheel 17 is rotated. During the inherent pivoting of the mirror body 5, the user can observe the mirror body 5 and its desired position. When the desired position has been reached, the electric motor 19 is switched off. This adjustment is, of course, effected separately for the axes 8 and 9.

In this connection it is important that a reversal of the electric motor 19 is not required. If the user, due to some circumstances, should miss the desired mirror position, he waits for the next cycle.

Figure 3:
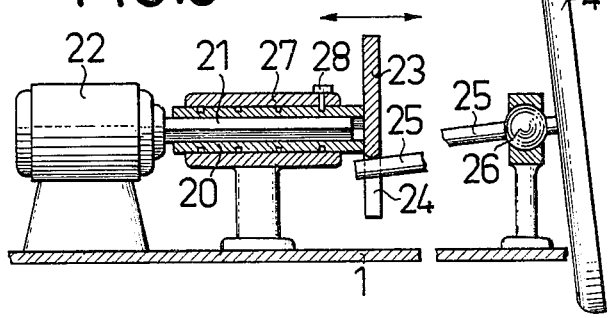
FIG. 3 is a diagrammatic illustration of a side view of a side view mirror according to the invention and its adjusting device.
Figure 4:
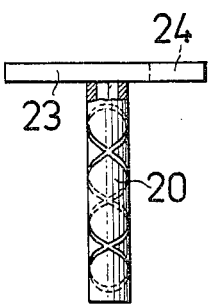
FIG. 4 is a top view of the spindle element for the adjusting device of FIG. 3.

With the mirror adjustment according to FIG. 3, the inverting spindle is not employed for the indirect adjustment but only for the direct adjustment.

In FIG. 3 the spindle provided with counter-current thread is designated with the reference numeral 20. The spindle 20 is hollow and longitudinally displaceable but is non-rotatably mounted on the motor shaft 21 of the electric motor 22. At the front end of the spindle 20 there is provided a flange 23 with a radial slot 24 into which extends a bar 25 which is fixedly connected to the mirror holding means 4. Bar 25 extends normal to the mirror surface and its longitudinal axis intersects the axis of rotation and the pivot axis of the ball joint 26. The spindle 20 in its turn is arranged in a bearing 27 which comprises a pin 28 for engaging the thread of spindle 20.

When the electric motor 22 turns, also spindle 20 will be turned correspondingly. Inasmuch as pin 28 engages the spindle 20, the spindle simultaneously with its rotation carries out a back and forth movement. Thus, also the distance of the flange 23 from the ball joint 26 changes. This brings about that during the rotation of the flange 23 the bar 25 is carried along while carrying out a tumbling movement, and the mirror body likewise carries out such tumbling movement. Inasmuch as simultaneously with the rotation of the flange 23 its distance from the ball joint 26 changes, also the amplitude of the tumbling movement of the mirror body changes. After the electric motor 22 has run for a certain period of time, the mirror body or the mirror holding means containing the mirror body tumbles practically through all possible mirror positions which can be observed by the user. When the desired position has been reached, the electric motor is switched off. If, however, the electric motor continues to run, the cycle is continuously repeated. The mirror body tumbles with a continuously changing amplitude.

It is, of course, to be understood that the present invention is by no means limited to the specific showing in the drawing but also comprises any modifications within the scope of the appended claims. Thus, although the invention has been described as comprising inverting spindles non-axially displaceably arranged in longitudinally displaceable sleeves which are linked to the mirror, it is also possible to have rotatable sleeves, the rotation of which is effected by the worm wheel 17, and spindles which are axially displaceably arranged in corresponding sleeves and are linked to the mirror.

What I claim is:

1. In a side view mirror arrangement for motor vehicles including:
    a mirror holding means with a motor drivingly connected thereto by interconnecting means therebetween having the improvement in combination therewith comprising one adjusting means including an inverting spindle with crisscrossing left hand and right hand threads, and a further adjusting means including a sleeve with a pin for engaging said threads of said spindle.

2. A side view mirror for motor vehicles, which includes:
    a mirror holding member;
    a motor; and
    at least one adjusting member comprising first adjusting means drivingly connectable to said motor, and second adjusting means interconnecting said first adjusting means and said mirror holding member and being movable relative to said first adjusting means, said first adjusting means comprising an inverting spindle provided with crisscrossing left hand and right hand threads.

3. A side view mirror according to claim 2, in which said second adjusting means comprises a sleeve arranged around said spindle, said sleeve being provided with a pin for engaging said threads of said spindle.

4. A side view mirror according to claim 2, which includes two adjusting members operable to pivot said mirror about two axes which are substantially perpendicular to one another.

5. A side view mirror according to claim 2, in which said first adjusting means comprises a flange connected to said inverting spindle and operable thereby to be displaced relative to said mirror, and in which said second adjusting means comprises a bar fixedly connected to said mirror holding member for imparting thereto a tumbling movement of continuously changing amplitude.

6. A side view mirror according to claim 5, in which said bar extends substantially perpendicular to the surface of said mirror, and which includes supporting means arranged stationarily relative to said mirror and pivotally supporting said bar.

7. A side view mirror according to claim 5, which includes a pin arranged stationarily relative to said motor and slidably engaging the thread of said inverting spindle, said inverting spindle being rotatable by said motor and axially displaceable by said pin.

8. A side view mirror according to claim 7, in which said flange is provided with a radial slot, said bar engaging said slot.

* * * * *